United States Patent Office 3,276,861
Patented Oct. 4, 1966

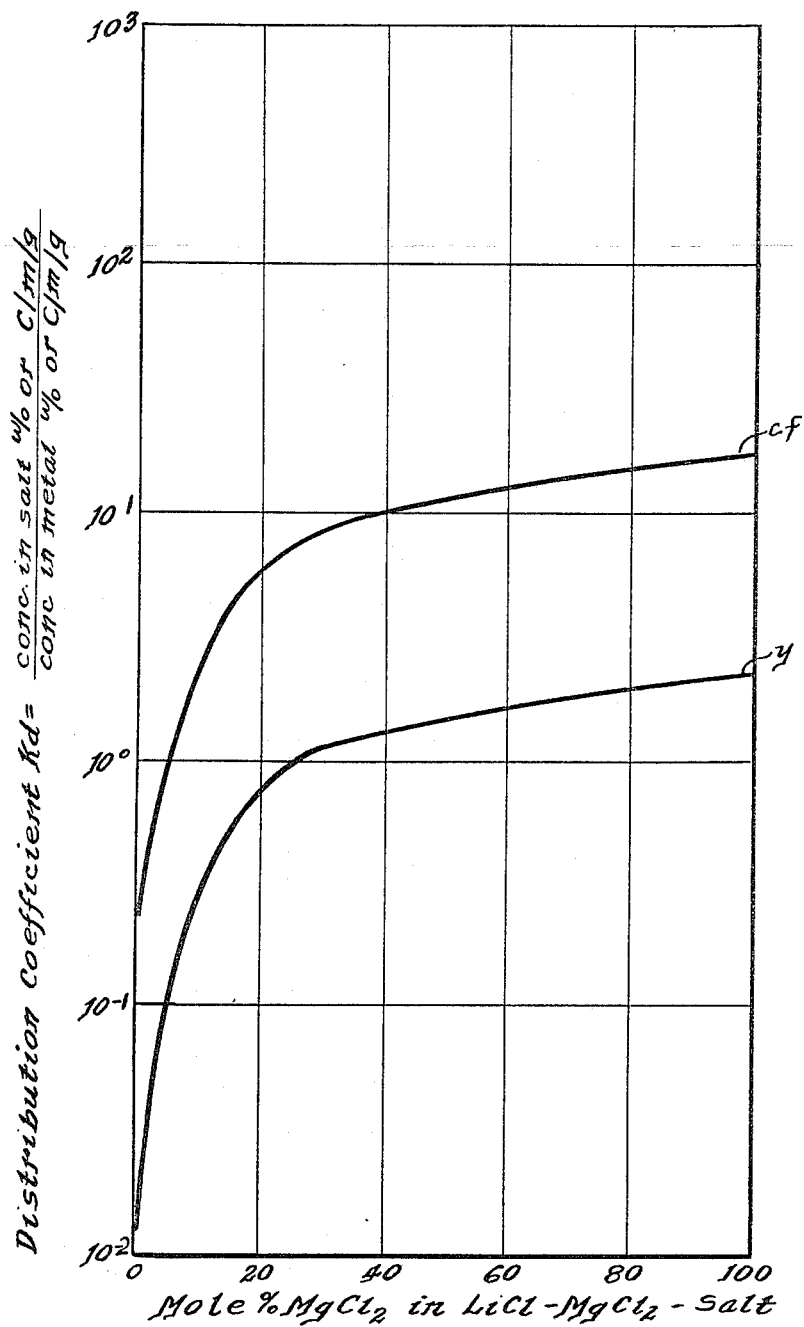

3,276,861
CALIFORNIUM AND EINSTEINIUM SEPARATION
James B. Knighton, Joliet, and Robert K. Steunenberg, Naperville, Ill., assignors to the United States of America as represented by the United States Atomic Energy Commission
Filed Oct. 15, 1964, Ser. No. 404,196
11 Claims. (Cl. 75—84.1)

The invention described herein was made in the course of, or under, a contract with the United States Atomic Energy Commission.

This invention relates to a process of separating californium and einsteinium from lanthanides including yttrium and from actinides, with the separation of californium from einsteinium and with the combination of the two separation processes.

Californium, element 98, and einsteinium, element 99, are obtained by the neutron bombardment of $Pu^{239}$. The reaction by which the $Pu^{239}$ is converted to einsteinium and californium proceeds primarily as follows:

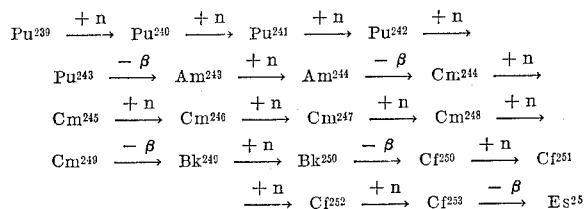

Californium and einsteinium consequently also occur together in solutions that have been obtained by the processing of spent nuclear plutonium fuel; these solutions can be the result either of an ion exchange method or of a solvent extraction method.

The californium isotope predominantly present in such solutions is $Cf^{252}$. It fissions spontaneously and therefore has utility as a neutron source in activation analysis on account of its intense neutron emission rate. It also is being considered as a heat source for Systems for Nuclear Auxiliary Propulsion (SNAP). Pure einsteinium is of interest in scientific research.

Actinides and lanthanides have been separated heretofore by differences in partition between molten halide salt and molten zinc-magnesium alloy phases. It was ascertained that the distribution ratios of the various elements were greatly dependent on the magnesium content of the alloy and that a maximum distribution into the alloy was always obtained with a magnesium content of between 8 and 14% by weight.

In studying californium and einsteinium, it has now been found unexpectedly that these two actinides do not follow this pattern and that for einsteinium the maximum distribution into the magnesium-zinc alloy is obtained with a magnesium content of about 30 w./o. in the alloy and, more broadly, with an alloy containing between 20 and 40% of magnesium. The californium distribution curve as a function of the magnesium concentration, on the other hand, has no minimum, but continues to show an increasing distribution into metal with increasing magnesium concentrations; this also was quite an unexpected finding. It was furthermore found that, although einsteinium and californium are actinides, they rather behave in these salt-metal extractions like the lanthanides and preferentially enter the salt phase. This is obvious from the drawings now to be discussed.

FIGURE 1 shows the distribution coefficients or ratios (concentration of element in salt, w./o.: concentration of element in metal, w./o.) for a number of actinides and lanthanides as they were determined by experiments at 800° C. in a tantalum crucible and an argon atmosphere; in all these experiments magnesium chloride was used as the salt and zinc-magnesium alloys of varying magnesium content were used as the metal.

FIGURE 3 shows the distribution coefficients for californium and yttrium at different magnesium chloride concentrations, as will be discussed in the example.

Figure 1:
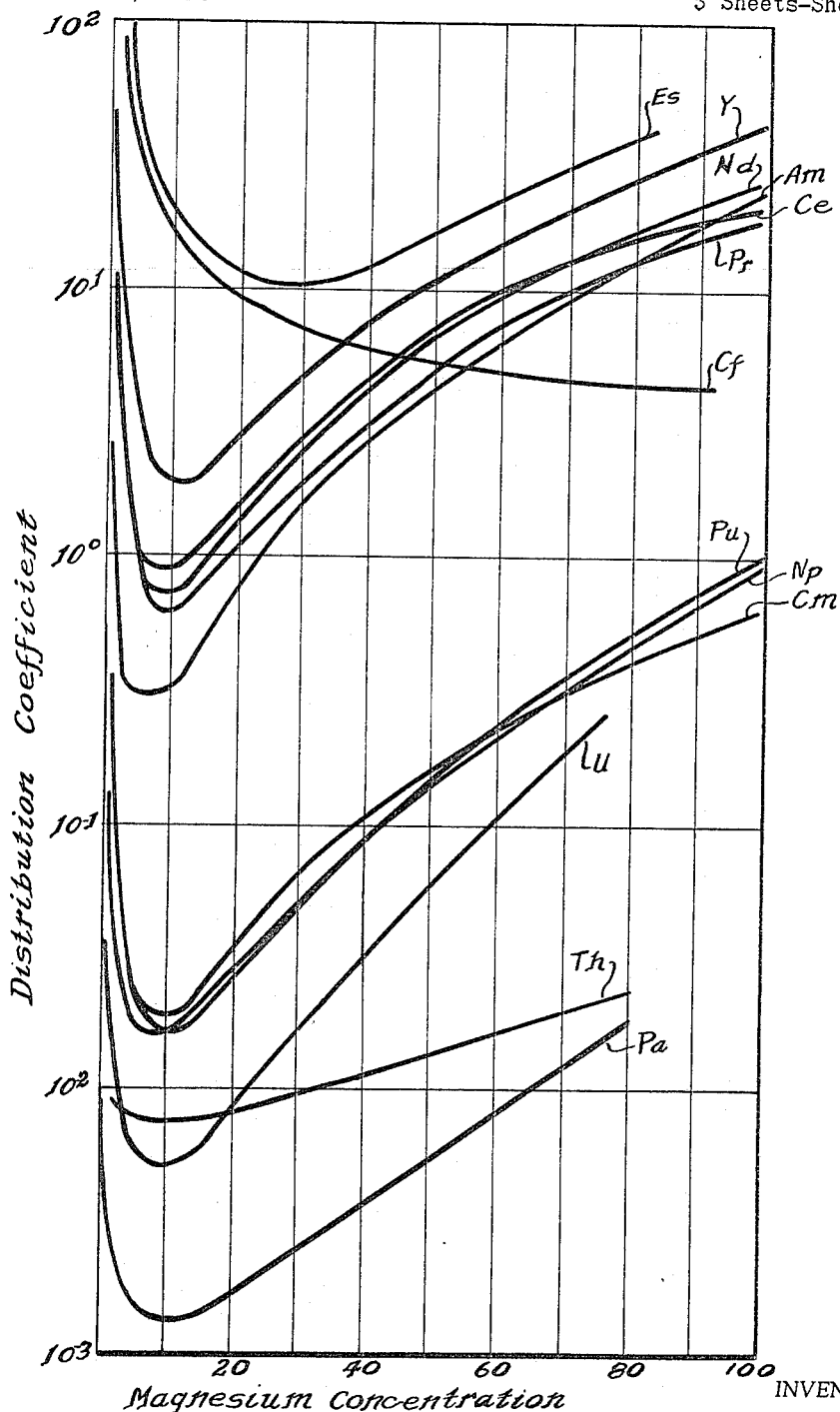

FIGURE 1 illustrates that the behavior of californium differs drastically from that of the other actinides and lanthanides, as has been mentioned above; while, with increasing magnesium concentrations of the alloy, the distribution of the lanthanides and actinides other than californium into the salt increases with higher magnesium concentrations in the solvent alloy, the californium curve continues to have a downward trend towards increased distribution into the metal. This unexpected behavior is beneficial for a separation of californium from einsteinium; for this separation the magnesium content should be at least 60%, but preferably close to about 90%, as is obvious from FIGURE 1.

Figure 2:
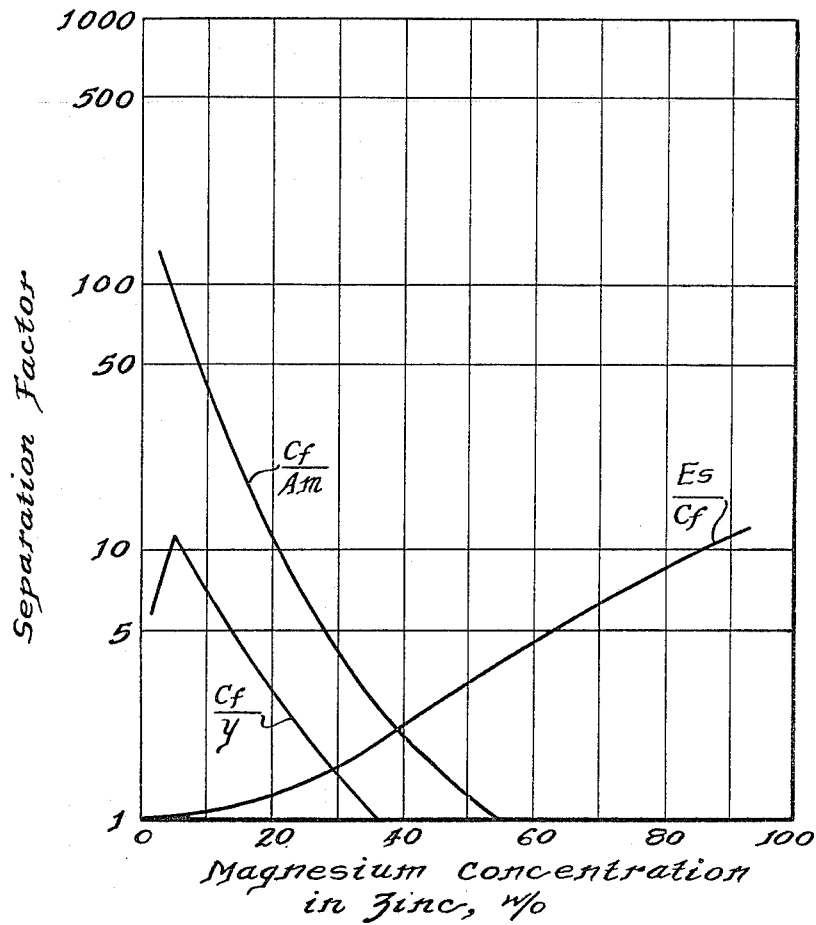
FIGURE 2 shows the separation factors for einsteinium from californium, for californium from americium and for californium from yttrium as they were calculated on the basis of the data of FIGURE 1. (The separation factor of einsteinium from californium, for instance, is the distribution coefficient of the formed divided by the distribution coefficient of the latter.)

FIGURE 2 suggests that higher separation factors are obtained for californium from other actinides as well as from lanthanides (yttrium is used as the representative of the lanthanides that is the most difficult to separate) with lower magnesium contents in the solvent alloy and that magnesium contents of between 2 and 10% bring about the best separation; it also shows clearly that the separation of einsteinium from californium is best at higher magnesium concentrations.

The process of this invention is based on these findings. It comprises introducing chlorinatable lanthanide and actinide material including californium and einsteinium into a molten magnesium-chloride-containing chloride salt; adding a molten magnesium-zinc alloy containing from 2 to 10% by weight of magnesium to the mixture obtained; thoroughly contacting the salt and the alloy mixture, whereby a salt phase containing the einsteinium and californium and an alloy phase containing any other actinides and lanthanides are obtained; separating the salt phase from the alloy phase; contacting molten magnesium-zinc metal containing from 60 to 90 w./o. of magnesium with the salt phase, whereby californium is preferentially taken up by a metal phase, while einsteinium is preferentially retained in the salt phase; and separating the magnesium-zinc metal phase from the salt phase. The process of separating einsteinium and californium from lanthanides and other actinides alone and the process of separating californium and einsteinium from each other alone are also considered part of this invention.

The process of this invention is applicable to any chlorinatable material, which mainly comprises elemental mixtures, carbides and oxidic mixtures, and also to halide mixtures.

The salt preferably consists of chlorides; it must contain magnesium chloride to obtain the separations desired. It may contain other chlorides, such as alkali metal chlorides and/or alkaline earth chlorides.

The process of this invention is preferably carried out in an inert atmosphere and at atmospheric pressure. Argon and helium have been found suitable inert gases.

The temperature used for the process is dependent on the type of salt and has to be above its melting point. However, the temperature should be well below the boiling points of the materials. In view of the boiling point of zinc, which is at 907° C., a maximum temperature of 850° C. was established for the process. Generally, the temperatures should range between 500 and 850° C.

It will be understood to those skilled in the art that changes in the salt:metal ratio and changes of the salt composition, in particular of its magnesium chloride content, have an effect on the degree of separation obtained and on the number of stages required.

Alumina and tantalum crucibles or other containers have been found equally satisfactory for the process of this invention.

In the following, an example is given for illustrative purposes.

*Example*

This example is to illustrate that californium, for instance, can be separated from yttrium, although in FIGURE 1 both elements show distribution coefficients of above one under the conditions there chosen. By varying the magnesium chloride concentration in the salt phase, the distribution coefficients can be adjusted so that californium is above and yttrium below unity, a desirable condition for good separation.

The experiments that yielded the curves of FIGURE 3 were made by individual runs using californium and yttrium, respectively, as representatives. The magnesium concentration in the alloy was 6% by weight in all instances. While macroquantities of yttrium were used for the experiments, californium was introduced in tracer quantities on a lanthanum fluoride carrier. A mixture of the salt and the magnesium-zinc alloy was in a tantalum crucible, and the experiments were carreid out in an argon atmosphere. The temperature was about 800° C. and thorough contact of the phases was accomplished by stirring the molten content of the crucible at 300 r.p.m.

FIGURE 3 shows the distribution coefficients that were obtained for californium and yttrium at the various magnesium chloride concentrations in the salt. These curves show that the ideal condition of one distribution coefficient being above and the other below unity was met by restricting the magnesium chloride concentration in the salt to the critical range of between about 5 and 27 m./o.

The above experiments were chosen for californium and yttrium, because they are about the two elements of FIGURE 1 that are the most difficult to separate. Since a satisfactory shift can be accomplished with these two elements, it will be all the easier to bring about a corresponding shift with the other actinides and lanthanides to which this application is directed.

It will be understood that the invention is not to be limited to the details given herein but that it may be modified within the scope of the appended claims.

The embodiments of the invention in which an exclusive property or privilege is claimed are defined as follows:

1. A process of separating californium and einsteinium values from the values of other actinides and from those of lanthanides, including yttrium, present together in a material selected from the group consisting of metal, oxide, carbide and halide, comprising introducing said material into a molten magnesium-chloride-containing salt; adding a molten magnesium-zinc alloy containing from 2 to 10% by weight of magnesium to the salt mixture; thoroughly contacting the alloy and the salt mixture, whereby a salt phase containing einsteinium and californium and an alloy phase containing any other actinides and lanthanides are obtained; separating the salt phase from the alloy phase; adding molten magnesium-zinc metal containing from 60 to 90 w./o. of magnesium to the salt phase, whereby californium is preferentially taken up by a metal phase, while einsteinium is preferentially retained in the salt phase; and separating the magnesium-zinc metal phase from the salt phase.

2. The process of claim 1 wherein the magnesium-zinc alloy contains about 5% by weight of magnesium.

3. The process of claim 1 wherein the salt is magnesium chloride diluted with a chloride selected from the group consisting of alkali metal chloride and alkaline earth chloride.

4. The process of claim 1 wherein the magnesium-chloride content of the salt ranges between 5 and 27 mole percent.

5. The process of claim 4 wherein the diluent chloride is lithium chloride.

6. The process of claim 1 wherein the reactions are carried out in an inert atmosphere at a temperature of between 500 and 850° C.

7. A process of separating californium and einsteinium values from the values of other actinides and from those of lanthanides, including yttrium, present together in a material selected from the group consisting of metal, oxide, carbide and halide, comprising introducing said material into a molten magnesium-chloride-containing salt; adding a molten magnesium-zinc alloy containing from 2 to 10% by weight of magnesium to the salt mixture; thoroughly contacting the alloy and the salt mixture, whereby a salt phase containing einsteinium and californium and an alloy phase containing any other actinides and lanthanides are obtained; and separating the salt phase from the alloy phase.

8. The process of claim 7 wherein the magnesium-zinc alloy contains about 5% by weight of magnesium.

9. The process of claim 7 wherein the magnesium-chloride content of the salt ranges between 5 and 27 mole percent.

10. A process of separating einsteinium values from californium values, comprising introducing a mixture containing said values into a molten magnesium-chloride-containing salt, comprising adding molten magnesium-zinc metal containing from 60 to 90 w./o. of magnesium to the salt phase, whereby californium is preferentially taken up by a metal phase, while einsteinium is preferentially retained in the salt phase; and separating the magnesium-zinc metal phase from the salt phase.

11. The process of claim 10 wherein the salt consists of magnesium chloride and a chloride selected from the group consisting of alkali metal chloride and alkaline earth chloride.

References Cited by the Examiner

AEC Document, ANL–6900, A.N.L. Chemical Engineering, Division Semiannual Report Jan.–June 1964, pp. 76–77.

BENJAMIN R. PADGETT, *Primary Examiner.*

S. TRAUB, *Assistant Examiner.*